(12) United States Patent
Oztan et al.

(10) Patent No.: US 7,634,150 B2
(45) Date of Patent: Dec. 15, 2009

(54) REMOVING RINGING AND BLOCKING ARTIFACTS FROM JPEG COMPRESSED DOCUMENT IMAGES

(75) Inventors: Basak Oztan, Rochester, NY (US); Zhigang Fan, Webster, NY (US); Reiner Eschbach, Webster, NY (US); Amal Z. Malik, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/463,768

(22) Filed: May 11, 2009

(65) Prior Publication Data

US 2009/0214113 A1 Aug. 27, 2009

Related U.S. Application Data

(62) Division of application No. 11/443,830, filed on May 31, 2006, now Pat. No. 7,532,767.

(51) Int. Cl.
G06K 9/40 (2006.01)
(52) U.S. Cl. ................ 382/268; 382/162; 382/168; 382/254; 382/199; 358/426.01
(58) Field of Classification Search ................ 382/162, 382/167, 168, 172, 268, 269, 274, 275, 254, 382/257, 266; 358/426.01, 426.05, 426.14, 358/426.16
See application file for complete search history.

(56) References Cited

U.S. PATENT DOCUMENTS

| | | | |
|---|---|---|---|
| 5,359,676 A | 10/1994 | Fan | |
| 5,379,122 A | 1/1995 | Eschbach | |
| 5,495,538 A | 2/1996 | Fan | |
| 5,521,718 A | 5/1996 | Eschbach | |
| 5,742,704 A * | 4/1998 | Suzuki et al. | 382/176 |
| 6,341,182 B1 | 1/2002 | Fitzgerald et al. | |
| 6,553,135 B1 | 4/2003 | Douglass et al. | |
| 6,668,097 B1 | 12/2003 | Hu et al. | |
| 7,339,992 B2 * | 3/2008 | Chang et al. | 375/240.25 |
| 2002/0097911 A1 | 7/2002 | de Queiroz | |
| 2003/0081836 A1 * | 5/2003 | Averbuch et al. | 382/199 |
| 2004/0207882 A1 | 10/2004 | Ahmed et al. | |
| 2005/0286766 A1 * | 12/2005 | Ferman | 382/190 |
| 2007/0053608 A1 | 3/2007 | Zhang et al. | |

OTHER PUBLICATIONS

N. Otsu, "A threshold selection method from gray level histograms," IEEE Trans. Syst. Man Cybern. SMC-9, 62-66 (1979).

* cited by examiner

*Primary Examiner*—Vikkram Bali
*Assistant Examiner*—Ali Bayat
(74) *Attorney, Agent, or Firm*—Fay Sharpe LLP (57) ABSTRACT

A method of removing ringing and blocking artifacts from a decompressed digital image. In one method, a background value of the digital image a background region and foreground regions is determined, and a threshold value is computed. A mapping of the digital image is then generated by thresholding the digital image based on the threshold value to produce a thresholded image, and enlarging the foreground regions of the thresholded image to form a map image. The mapping includes the background pixels of the map image. The background region of the decompressed digital image is then cleansed based on the mapping. In an alternate method, ringing artifacts are removed from a decompressed digital image based on a signal-to-noise ratio of the image. In yet another alternate embodiment, ringing artifacts are from a decompressed digital color image that includes a chrominance channel and a luminance channel. An alternate embodiment removes ringing and blocking artifacts.

10 Claims, 12 Drawing Sheets

REMOVING RINGING AND BLOCKING ARTIFACTS FROM JPEG COMPRESSED DOCUMENT IMAGES

CROSS-REFERENCE TO RELATED APPLICATION

This application is a divisional of U.S. application Ser. No. 11/443,830 filed May 31, 2006. U.S. application Ser. No. 11/443,830 filed May 31, 2006 is hereby expressly incorporated by reference into this specification.

BACKGROUND

The present invention is directed to a method of decompressing images compressed in accordance with the currently proposed JPEG ADCT (adaptive discrete cosine transform) standard, and more particularly, a method of reducing decompression ringing artifacts in document-type images resulting from decompression of standard JPEG ADCT compressed images.

Data compression is commonly used in data handling processes where too much data is present for practical storage or transmission of the data. For example, compression is used in communication links, where the time to transmit is relatively long, or where bandwidth is limited. Another use for compression is in data storage, where the amount of media space on which the data is stored can be substantially reduced with compression. Yet another application is a digital copier where an intermediate storage is useful for collation, reprint or any other digital copier functions. Generally speaking, scanned images, i.e., electronic representations of hard copy documents, are commonly large, and thus are desirable candidates for compression.

Many different compression techniques exist, and many are proprietary to individual users. However, standards are desirable whenever intercommunication between devices will be practiced. Particularly with the advent of multimedia communication, where formerly dissimilar devices are required to communicate, a common standard will be required. An example is the current desirability of FAX machines to be able to communicate with printers. Currently, compression standards are generally distinct for different devices.

ADCT (Adaptive Discrete Cosine Transform, described for example, by W. H. Chen and C. H. Smith, in "Adaptive Coding of Monochrome and Color images", IEEE Trans. Comm., Vol. COM-25, pp. 1285-1292, November 1977), as the method disseminated by the JPEG committee will be called in this application, is a lossy system which reduces data redundancies based on pixel to pixel correlations. The ADCT process and some of its problems related to document images are discussed in U.S. Pat. No. 5,379,122 to Eschbach, incorporated herein by reference in its entirety. In particular, the process cannot reproduce the original image since data within the image was discarded in a compression-quantization step. Failures are noted wherever strong edges, commonly present in text, appear. Particularly, at such edges "ringing artifacts" or in some references, "mosquito noise" is noted. These problems occur in text and graphics, components very common in document images. In addition to mosquito noise or ringing artifacts, a blocking artifact often appears which is associated with image areas having slowly varying grays, where each M×M block into which the image was divided, and which formed the calculation of the compression basis, becomes visually distinguishable from adjacent blocks.

Eschbach describes a method of decompressing a document image which removes or lessens the effects of the artifacts noted above. Although Eschbach's method cannot accurately determine the original image because that image has been lost, the method does render the decompressed image more visually appealing, and creates an image which is also one of the images in a set of images which would have produced the same set of quantized ADCT values, and thus could be the original image. Eschbach's method is, however, computationally intensive.

BRIEF DESCRIPTION

It is therefore an object of the present application to provide a method of removing ringing and blocking artifacts in a decompressed document image.

It is also an object of the present application to provide a more efficient method of removing background noise in a decompressed document image.

It is a further object of the present application to provide a method of removing ringing and blocking artifacts in a decompressed document image which does not increase computational costs significantly.

It is a yet further object of the present application to provide a method of removing ringing and blocking artifacts in a decompressed document image that produces a more visually appealing image.

Still further, it is an object of the present application to provide a method of removing ringing and blocking artifacts in a decompressed document image that produces a more easily understood document image when the document image includes text.

A method is provided for removing ringing artifacts from a decompressed digital image that includes background and foreground regions. A background value of the digital image is determined and a threshold value is computed, the threshold essentially being a boundary value between background pixels of the digital image and foreground pixels of the digital image. A mapping of the digital image is then generated by thresholding the digital image based on the threshold value to produce a thresholded image, and enlarging the foreground regions of the thresholded image to form a map image. The mapping includes the background pixels of the map image. The background region of the decompressed digital image is then cleansed based on the mapping.

Another method of removing ringing artifacts from a decompressed digital image based on a signal-to-noise ratio of the image is provided. The decompressed digital image also includes a background and one or more foreground regions. Encoded quantized transform coefficients are received for each block of an original image, and the decompressed image is generated by applying an inverse transform operation to the received transform coefficients. A signal-to-noise ratio of the digital image is computed, and a background value of the decompressed image is also determined. Then, based on the computed signal-to-noise ratio, either a low SNR data-cleaning process, a medium SNR data-cleaning process, or a high SNR data-cleaning process is performed. For the low SNR data-cleaning process, a threshold value is computed, the threshold essentially being a boundary value between background pixels of the decompressed image and foreground pixels of the decompressed image, and a low SNR map generating process is performed. In this process, the decompressed image is thresholded based on the threshold value to produce a thresholded image, and the foreground regions of the thresholded image are enlarged to form a map image. The foreground regions of the map image now include edge pixels of the original foreground regions. The desired mapping includes the background pixels of the map image. The background region of the decompressed digital image is then cleansed image based on the mapping. A new transform coefficient is then computed for each image block of the cleansed image and the new transform coefficients of the cleansed image are compared to the received transform coefficients. Based on the comparing, for each new transform coefficient which does not match the received transform coefficient, the respective block of the cleansed image is restored based on the received transform coefficient. For the medium SNR data-cleaning process, the threshold value is computed and a medium SNR map generating process is performed. In the medium SNR map generating process, the decompressed image is thresholded to produce a thresholded image, and the foreground regions of the thresholded image are enlarged to form the map image where the foreground regions of the map image include edge pixels of the original foreground regions. The mapping includes the background pixels of the map image, and the background region of the decompressed digital image is cleansed, based on the mapping, to form the cleansed image. In the high SNR data-cleaning process, the threshold value is computed, and a high SNR map generating process is performed. The high SNR map generating process includes thresholding the decompressed image based on the threshold value to produce the map image, the mapping including the background pixels of the map image, and cleansing the background region of the decompressed digital image based on the mapping to form the cleansed image.

Yet another method of removing ringing artifacts from a decompressed digital color image which includes a chrominance channel and a luminance channel is provided. The digital color image also includes a background and one or more foreground regions. A luminance channel processing is performed, including extracting a luminance channel histogram from the luminance channel, and determining a background luminance value by selecting the most frequently occurring value from the luminance channel histogram as the background luminance value. Also, a threshold luminance value, is computed and the luminance channel is thresholded based on the threshold luminance value to form a thresholded luminance channel. A morphological filtering is performed on the thresholded luminance channel to form a mapped luminance channel image. The morphological filtering is either a dilation process or an erosion process based on the background luminance value, which enlarges the foreground regions of the thresholded luminance channel. The enlarged foreground regions now include edge pixels of the original foreground regions, and the background pixels of the mapped luminance channel image form a luminance mapping of the digital image luminance channel which includes the background pixels of the mapped luminance channel image based on the threshold luminance value. The background region luminance channel of the decompressed digital image is then cleansed based on the luminance mapping.

Still another method is provided for removing ringing and blocking artifacts from a decompressed digital image. The decompressed digital image is divided into tiles, and an enhancement process is performed for each pixel of the decompressed image. For the enhancement process, the following condition steps are performed. If the current pixel is a text pixel and a non-edge pixel, a histogram is collected for the tile containing the current pixel, the histogram including histogram counts as a function of histogram values. For each histogram value, the current pixel value is replaced with the histogram value if the histogram count is greater than or equal to a predetermined percentage $TH_1$ and if the absolute value of the current pixel value minus the histogram value is less than or equal to the predetermined threshold $TH_2$. If the current pixel is a non-text pixel and a non-edge pixel, a smoothing filter is applied to the current pixel based on the neighborhood pixels including the current pixel if at least one edge pixel lies within the tile containing the current pixel. If the current pixel is an edge pixel, an edge enhancement filter is applied to the current pixel.

DETAILED DESCRIPTION

JPEG is a well-known and widely used image compression technique. In JPEG, the image can be selectively compressed at user-selectable quality factors. However, as the compression ratio increases in response to lower quality factors, blocking and ringing artifacts become increasingly apparent and more disturbing to the person viewing the image after decompression. Although low compression ratios, i.e., high quality factor, are preferable to ensure a high visual quality, for applications where storage size is an important factor or where a low network bandwidth exists, higher compression ratios are more attractive. For example, storage requirements for a book scanning project can be significantly reduced by utilization of a high compression ratio. Similarly, the productivity of an image processing and printing system can be significantly increased by using higher compression ratios to better utilize the available network bandwidth.

Figure 1:
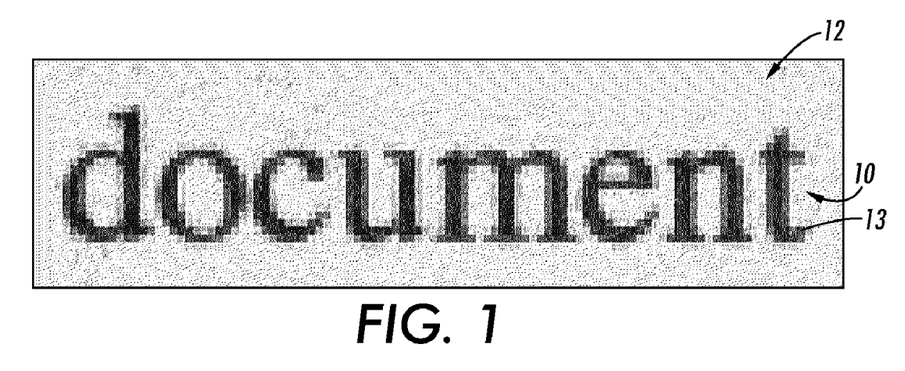
FIG. 1 is an original document image to be compressed by an ADCT compression process.

Generally, natural images, on a pixel-to-pixel basis do not vary by large amounts, i.e., sharp edges are rare in natural images, leading to small pix-to-pixel value differences. These images, therefore, have what is known as "natural spatial correlation." In natural scenes, correlation is generalized, but not exact. Noise generally makes each pixel somewhat different from its neighbor pixels. Although a natural image, when highly compressed, may exhibit both blocking and ringing artifacts, the ringing artifacts are usually subdued and somewhat hidden by the natural noise in the image. However, unlike natural images, document images exhibit ringing artifacts near the edges of the textual components. For example, FIG. 1 shows a portion of an original document image including a textual portion 10 having the word "document" displayed over a background area 12. The document image in the Figure is shown enlarged enough that individual pixels are evident, such as the pixel 13 at the foot of the letter "t."

Figure 2:
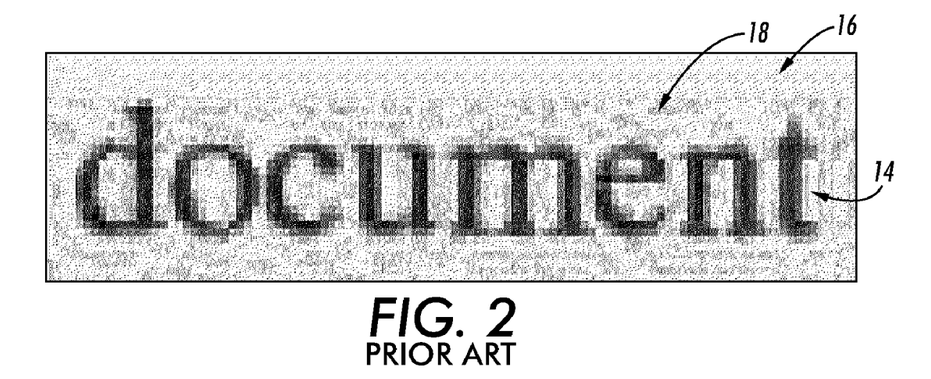
FIG. 2 is the document image of FIG. 1 showing ringing artifacts after being decompressed by a prior art ADCT decompression process.

With reference now to FIG. 2, the effects of compressing the image of FIG. 1 with a JPEG quality factor of 20 and then decompressing it are shown. The decompressed textual portion 14 is shown over the decompressed background 16. It can be readily observed that the background 16 includes ringing artifacts 18 which visually degrade the appearance of the image. It may be observed, however, that the visual appearance of the image can be improved by removing the ringing artifacts 18 in the background portion 16 of the image. The process of removing the ringing artifacts 18 can be made simpler if the image has been segmented and the textual part has been isolated as shown in the figure. Ringing artifact removal can be similarly made easier for images having properties similar to textual documents such as, e.g., line drawings. Because segmentation is now becoming a more popular pre-processing step for many applications, e.g., mixed-raster content imagining (MRC) and object oriented rendering, working on segmented images is a valid assumption for many applications.

Figure 3:
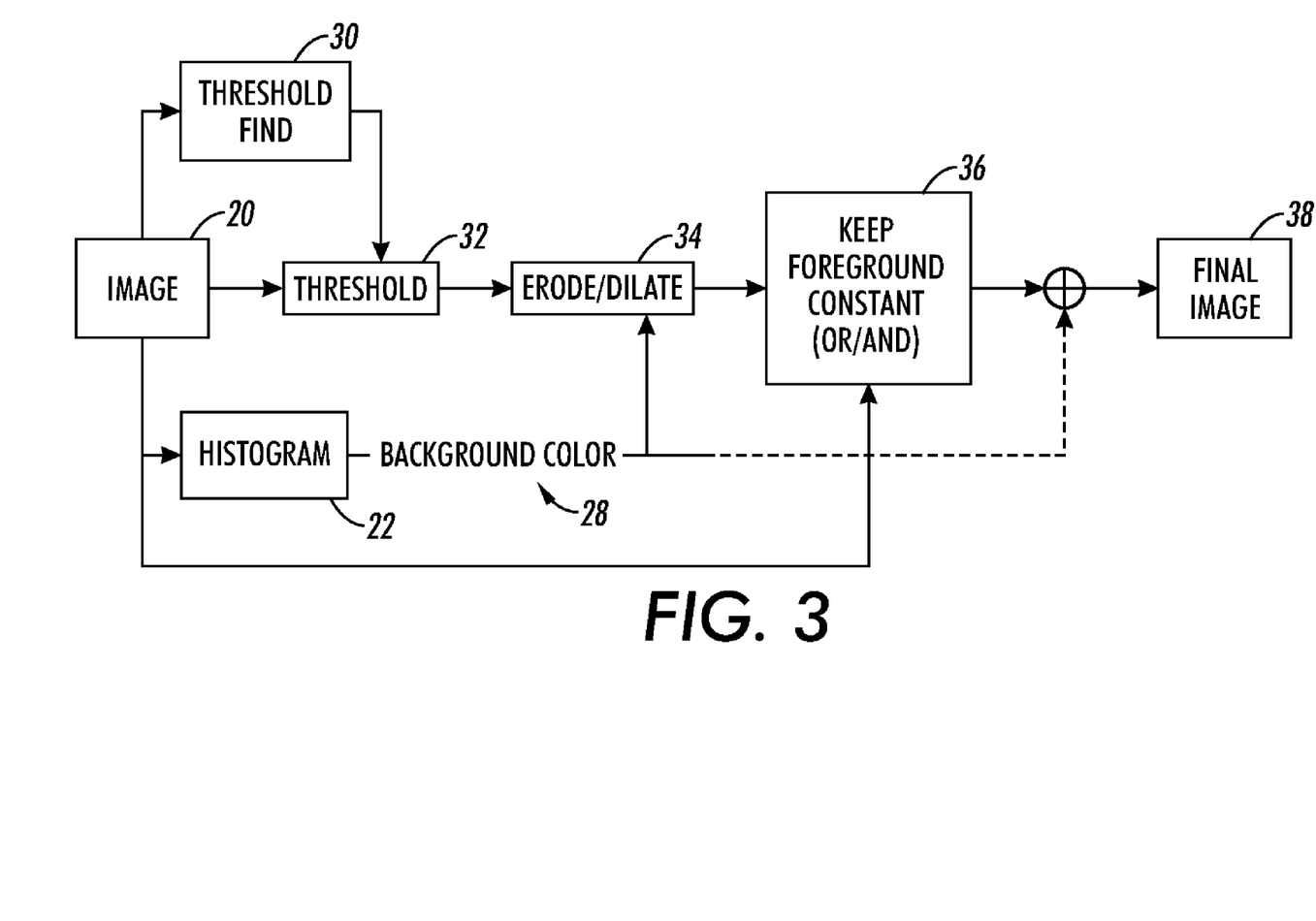
FIG. 3 is a functional block diagram of a method for removing ringing artifacts as shown in FIG. 2.

With reference now to FIG. 3 and continuing reference to FIG. 2, a method of removing the ringing artifacts 18 is described. It should be noted that although ringing also exists both in the foreground textual region 14 and along the edge of the text characters in the textual region 14, it is usually less visible in these regions due to the masking effects of the text. Based on this observation, the described method preferably clears ringing artifacts and other noise in the background region 16 but leaves the foreground region and edges of the characters in the textual region 14 unchanged.

Figure 4:
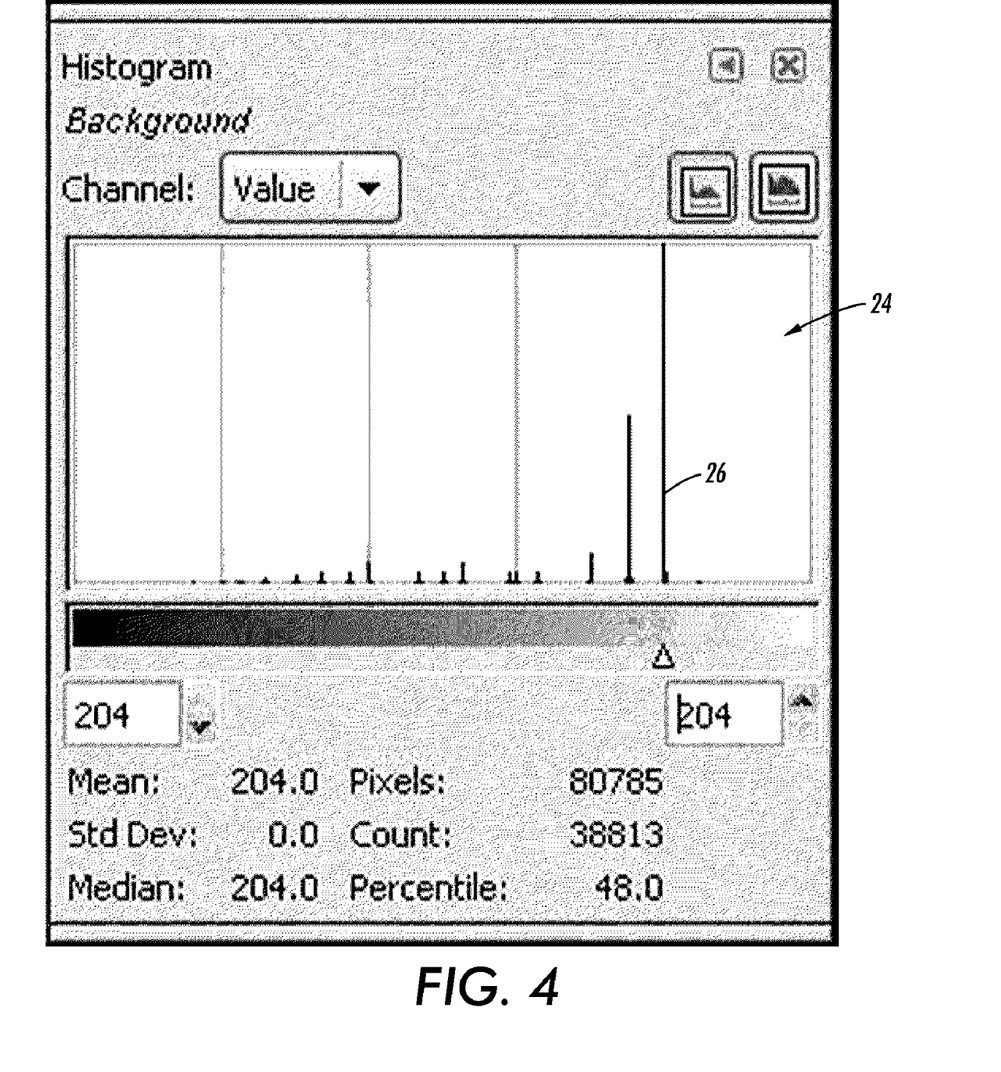
FIG. 4 is histogram of the decompressed image shown in FIG. 2.

In the method shown, it is assumed that the image 20 is a segmented grayscale image containing textual information, or similar information, such as a line drawing for example, and that the image 20 has a single background grayscale value. A histogram of the image 20 is extracted (22) for analysis. Because most document images consist of some textual components but largely consist of blank areas of the image, the task of finding the background value of the image is somewhat simplified. For example, the most frequent gray level value can be chosen as background in a grayscale image. With a momentary reference to FIG. 4, a histogram 24 of the document image of FIG. 2 is shown. It is apparent that the large vertical bar 26 which corresponds to a grayscale value of 204 on a scale of 0 to 255 is the most frequently occurring grayscale value in the image. In this particular case, the grayscale value of 204 accounts for 48 percent of the pixels in the image. However, considering that in some images there may be other gray values in the vicinity of the highest frequency value, a weighted sum of those values may be computed to find the background value of the image.

In addition to determining the background value 28, a threshold value is determined automatically (30) and is used to cleanse or remove the ringing artifacts and other noise in the background of the image. The threshold value is essentially a boundary value dividing background pixel values and foreground pixel values. Thresholding is known to be a powerful technique to eliminate noise in document binarization algorithms. Therefore, it is also effective in eliminating ringing artifacts, particularly for low and moderate levels of image compression. Thresholding algorithms can be generally grouped into two categories: global thresholding which uses a single threshold for the entire image, and local thresholding which computes different threshold values for each pixel depending on the values of neighboring pixels in the image. Generally, the latter technique is the more powerful of the two, however, since most document images have the same background formation throughout the image, a global thresholding algorithm can perform as satisfactorily as a local thresholding algorithm while offering the benefit of being more computationally efficient. It should be remembered, however, that the global thresholding algorithm is being applied to a segmented image as opposed to the entire image.

A suitable global thresholding algorithm is described by Nobuyuki Otsu in "A Threshold Selection Method from Gray Level Histograms," IEEE Transactions on Systems, Man, and Cybernetics, Vol. SMC-9, No. 1, 62-66 (1979), incorporated herein by reference in its entirety. Otsu uses the image histogram to minimize the interclass variance between the foreground and background pixels. Based on the Otsu reference, an optimal threshold value can be computed as:

$$T = \arg\max_T \frac{P(T)(1-P(T))(\mu_f - \mu_b)^2}{P(T)\sigma_f^2 + (1-P(T))\sigma_b^2} \quad (1)$$

where $$P(T) = \sum_{i=0}^{T} p(i) \quad (2)$$

$$\mu_f = \sum_{i=0}^{T} i \times p(i), \quad (3)$$

$$\mu_b = \sum_{i=T+1}^{255} i \times p(i)$$

$$\sigma_f^2 = \sum_{i=0}^{T} (i - \mu_f)^2 p(i), \quad (4)$$

$$\sigma_b^2 = \sum_{i=T+1}^{255} (i - \mu_b)^2 p(i)$$

and p(i) is the histogram probability. In other words, the threshold value T is the argument for Equation 1 which maximizes the expression shown. As shown in the figure, the thresholding 32 is performed on the image using the threshold value determined in the threshold finding step 30.

In order to prevent the above-described thresholding process from affecting edge pixels, i.e., pixels adjacent to textual portions of the image, the thresholded image is either eroded or dilated, preferably by a 2 by 2 square window for forming a map image in which the foreground parts of the thresholded image are thicker in the map image, thereby including the edge pixels. An eroding/dilating step 34 utilizes the background value 28 information to determine whether the image needs to be eroded or dilated. For example, if the image has a darker foreground on a brighter background, it should be eroded if the image processing program functions assume white to be the foreground value. Similarly, if the image contains a brighter foreground on a darker background, e.g., white text on a black background, the image would be dilated. As mentioned, however, the decision to erode or dilate is dependent on the specific implementation of the erosion and dilation functions of the particular image processing program. Also, many image processing programs utilize a 3 by 3 kernel having the center pixel defined as the origin which also provides the desired dilation/erosion effect on the image. Alternately, larger windows may also be used to provide a stronger erosion/dilation effect.

A cleaning process 36 is now performed to remove the ringing artifacts and other noise from the background while maintaining the foreground in a constant state. The cleaning process obtains a map from the map image identifying which pixels are background pixels and which pixels are foreground and edge pixels. Using the map, an operation preferably corresponding to a logical OR or a logical AND using the original image 20 and the thresholded image is performed. The choice of a logical OR operation or a logical AND operation depends on whether the background is brighter than the foreground or vice versa. This essentially flattens the background region to a more constant value while leaving the foreground regions essentially unchanged.

Figure 5:
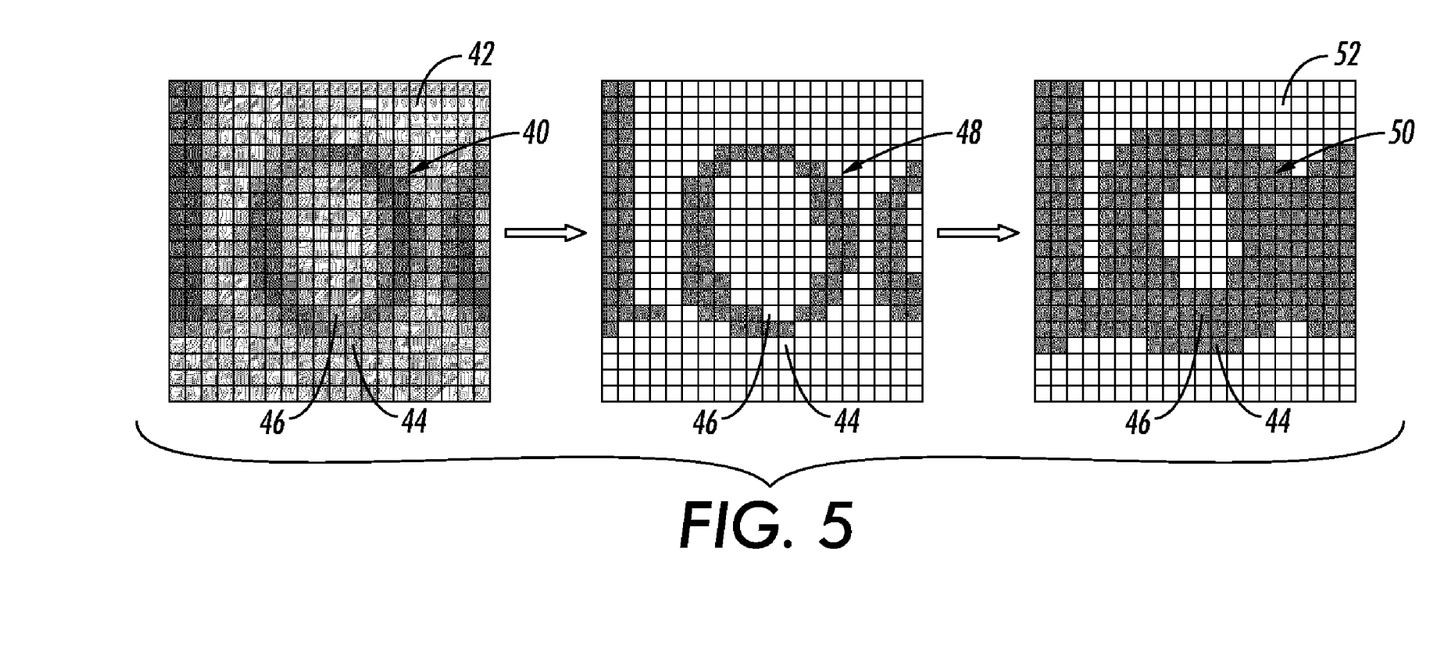
FIG. 5 is an example of an erosion/dilation and background mapping process according to an embodiment of the present application.

With reference now to FIG. 5, a more detailed description of the thresholding, erosion/dilation, and background mapping process is shown. The letter O (40) of the compressed image is shown with a dark foreground over a light background area 42. An inside edge pixel 46 and an outside edge pixel 44 are shown for reference. The thresholding process 32 now produces a thresholded letter O (48) where it may be observed that edge pixels 44 and 46 are no longer nested within the thresholded letter O. For the erosion/dilation process, it is assumed in this instance that the dilation process is configured for a dark foreground, therefore, the dilation process is used to expand the thresholded letter O into a dilated letter O (50). It may be observed that the identified edge pixels 44, 46 are now nested within the dilated letter 50. The dilating performed in the erosion/dilation step 34, when applied to the thresholded letter 48, produces a dilated letter O (50) over a white background. The white background provides the necessary mapping 52 for the cleansing process 36.

Figure 6:
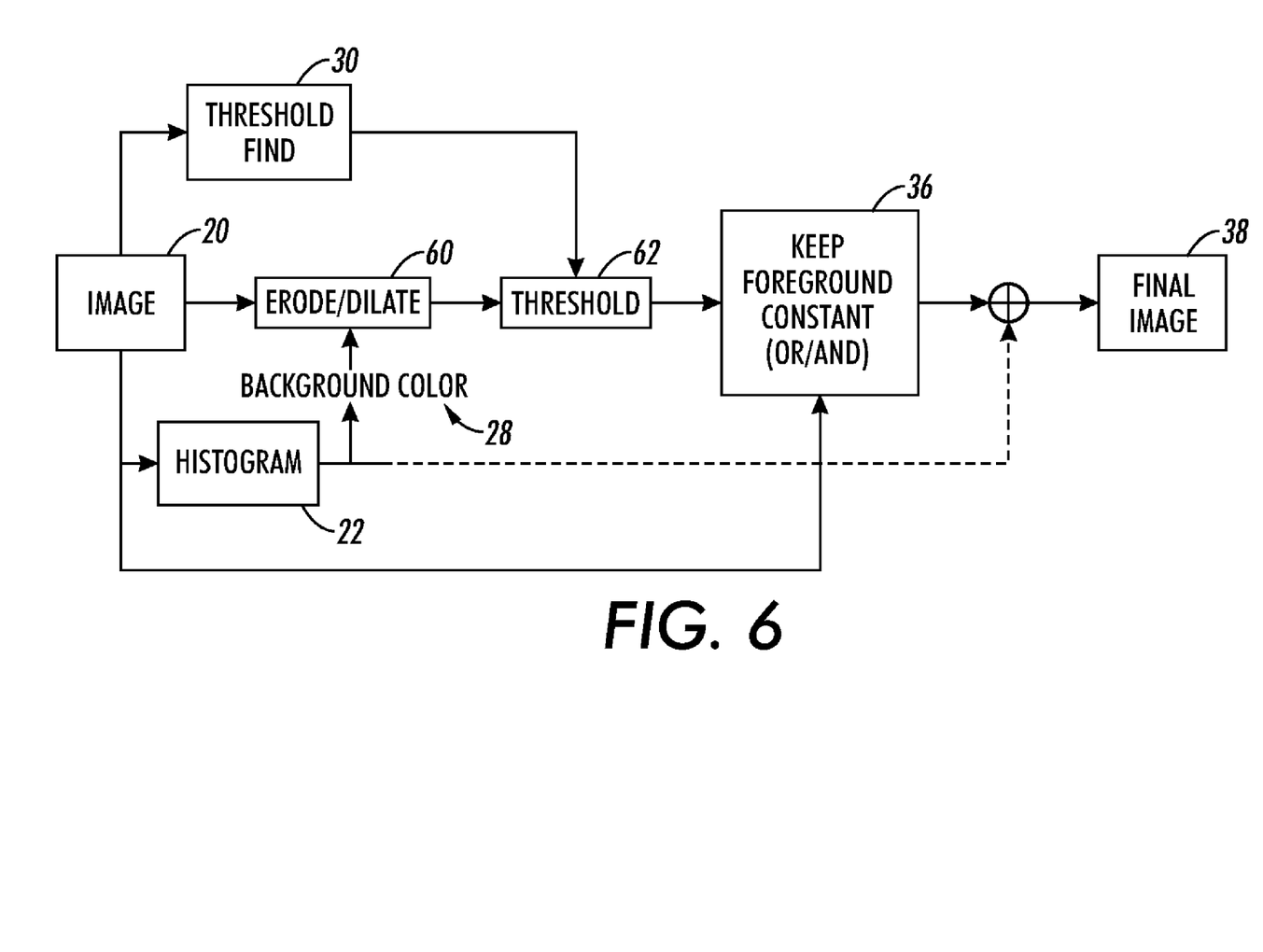
FIG. 6 is a functional block diagram of an alternate method for removing ringing artifacts.
Figure 7:
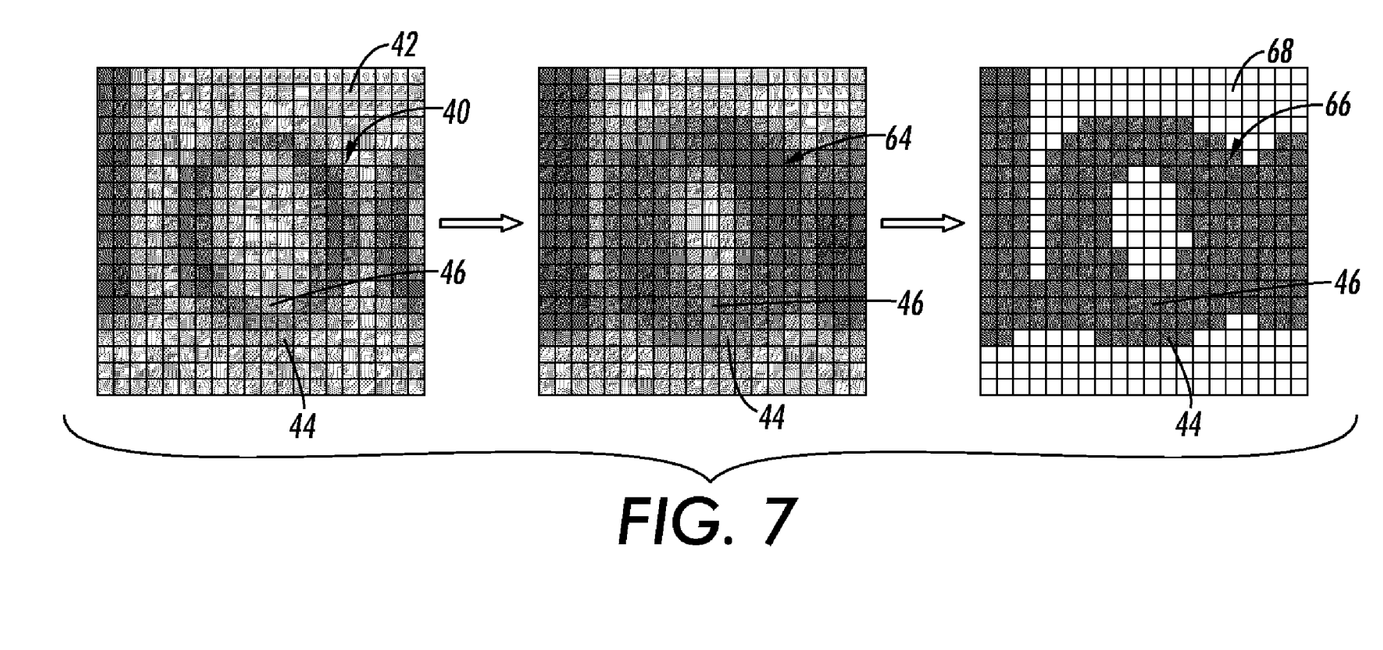
FIG. 7 is an example of an alternate erosion/dilation and background mapping process according to an embodiment of the present application.

With reference now to FIG. 6, where identical numerals represent identical processes, an alternate method of applying the erosion/dilation prior to the thresholding process is shown. The method is essentially the method shown in FIG. 3 with the exception of the erosion/dilation process 60 which occurs before the thresholding process 62. This process is described in more detail now with reference to FIG. 7. The compressed letter O (40) is shown over the background 42, along with edge pixels 44, 46 as shown previously in FIG. 5. The thresholding process 60 produces a thresholded letter O (64) where it may be observed that edge pixels 44 and 46 are no longer nested within the thresholded letter O. However, the threshold process now produces a thresholded letter O (66) which can readily be observed to be essentially identical to the dilated letter O (50) as shown in FIG. 5. The white background similarly serves as the mapping 68 for the cleansing process 36.

Figure 8:
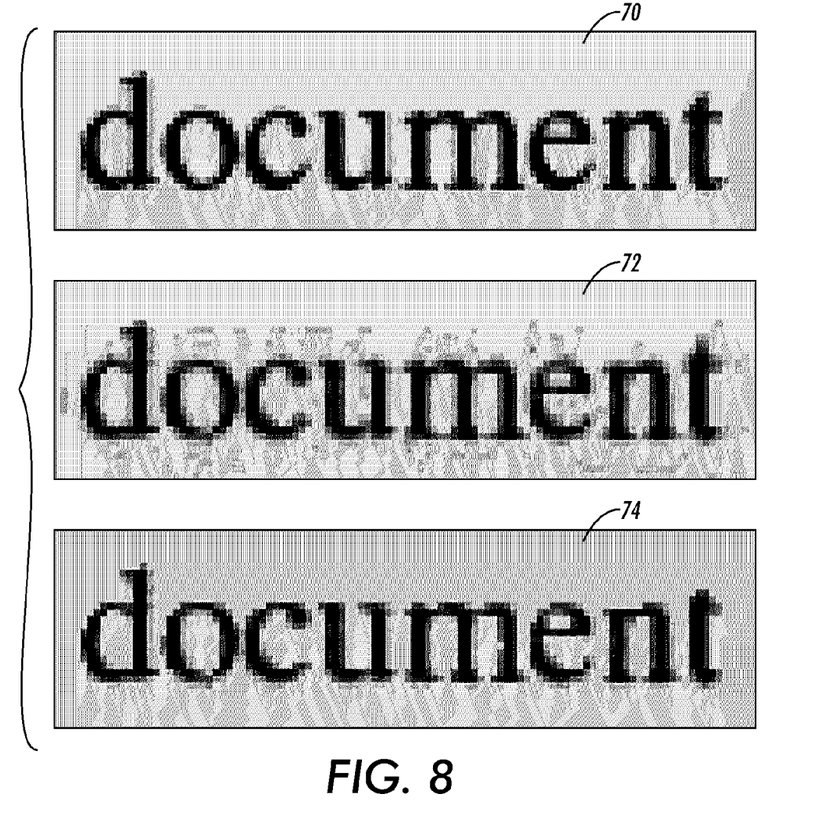
FIG. 8 is an example of ringing artifact removal according to an embodiment of the present application.

An example of the above-described process is shown with reference to FIG. 8. An original document image 70 is compressed with, for example, a JPEG quality parameter of 20, producing the compressed image 72 containing a noticeable quantity of ringing artifacts. A cleansed document image 74 is produced by an embodiment of the above-described ringing artifact removal methods, demonstrating a noticeably improved image when compared to the compressed image 72.

While the aforementioned methods have been described with reference to grayscale images, the above-described methods can be applied with equal efficacy to color images with a minor change to the methods. For example, if a color image consists of three channels, the methods can be applied to each of the three channels separately. However, if the image is provided, or converted into, a luminance-chrominance domain, most of the visible ringing noise, i.e., ringing artifacts, comes from the luminance channel. Applying the above-described method to just the luminance channel provides sufficiently good results when compared to the three-channel process to provide a computationally efficient method of removing ringing artifacts. Essentially, the computational cost is reduced by a factor of one third.

Figure 9:
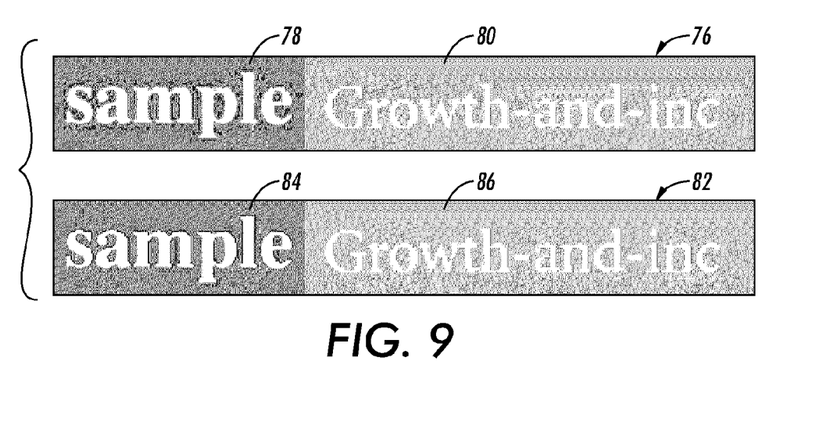
FIG. 9 is an example of ringing artifact removal in a color image according to an embodiment of the present application.

With reference to FIG. 9, a compressed color document 76 is shown having white lettering on a green background 78 and an amber background 80. A significant number of ringing artifacts can be observed surrounding the white lettering in both the green background 78 and the amber background 80. A cleansed image 82 produced by applying the above-described method to only the luminance channel is shown having a cleansed green background 84 and a cleansed amber background 86. A significant visual improvement can be readily observed, however, it may also be observed that the green background 84 still retains some evidence of ringing artifacts. It may be desirable for these cases, to also clean ringing artifacts from the chrominance channel. However, some computational efficiency may be gained by using the threshold map obtained for the luminance channel to clean ringing artifacts from the chrominance channels. The background values of the chrominance channels can be computed as the average of the pixels that are determined by means of the threshold map and applied as a constant background value for the channels. An increase in computational efficiency may thus be realized.

Figure 10:
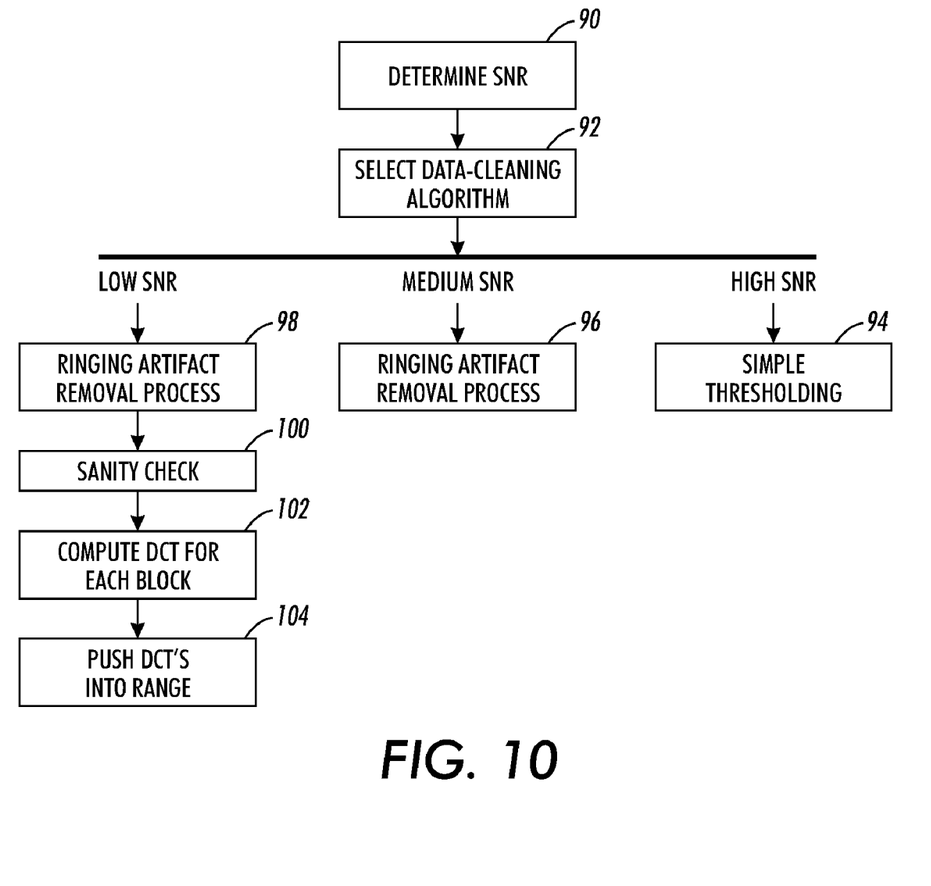
FIG. 10 is a functional block diagram of another method for removing ringing artifacts utilizing an estimation of the signal-to-noise ratio.

In yet another embodiment, an estimation of the signal-to-noise ratio (SNR) is utilized. There are numerous factors that may have impacts on the SNR, including quantization levels, text and background colors (gray levels), character shapes, text sharpness, text sizes, etc. However, a simple, yet sufficiently accurate SNR estimation is provided by the dynamic range/Q-factor ratio. With reference now to FIG. 10, after determining the SNR (90), a data cleaning algorithm is selected (92) according to the value of the SNR. For a high value of the SNR, a simple thresholding (94) generates satisfactory results. Any reasonable threshold such as, e.g., the mean of the dynamic range, generates satisfactory results. For a medium valued SNR, ringing artifact removal (96) is performed according to any of the above-described methods. For a low value of SNR, ringing artifact removal (98) is first performed according to any of the above-described embodiments, however, a sanity check (100) is performed following the ringing artifact removal. For a JPEG image, the compressed image includes encoded quantized transform coefficients, i.e., DCT coefficients, for each block of the original image, the image having been divided into blocks of pixels during the compression process. The decompressed image is generated by applying an inverse transform operation to the received transform coefficients. A DCT coefficient is computed for each respective image block of the cleansed image (102) to determine if the DCT coefficients of the cleansed image fall within the original quantization levels. If not, the DCT coefficients are pushed back (104) and restored to the original quantization range. This process prevents major errors being introduced into the cleaning process, e.g., classifying a significant portion of the text into the background. In some embodiments, the above-described procedure can be iterative, i.e., cleaning, checking, cleaning again, etc. Classification of the SNR into the above-described three categories can be assisted by experimenting with various Q-factor and data settings and tabulating the results.

In yet another embodiment, a method is provided which removes both ringing and blocking artifacts when displaying document images. As with the above-described embodiments, the image is segmented into text and non-text segments. Additionally, however, using edge detection techniques as known in the art, the decompressed image pixels are also tagged as edge/non-edge in addition to being tagged as text/non-text. Based on the tags, different techniques are applied to remove the ringing and blocking artifacts from the image.

Figure 11:
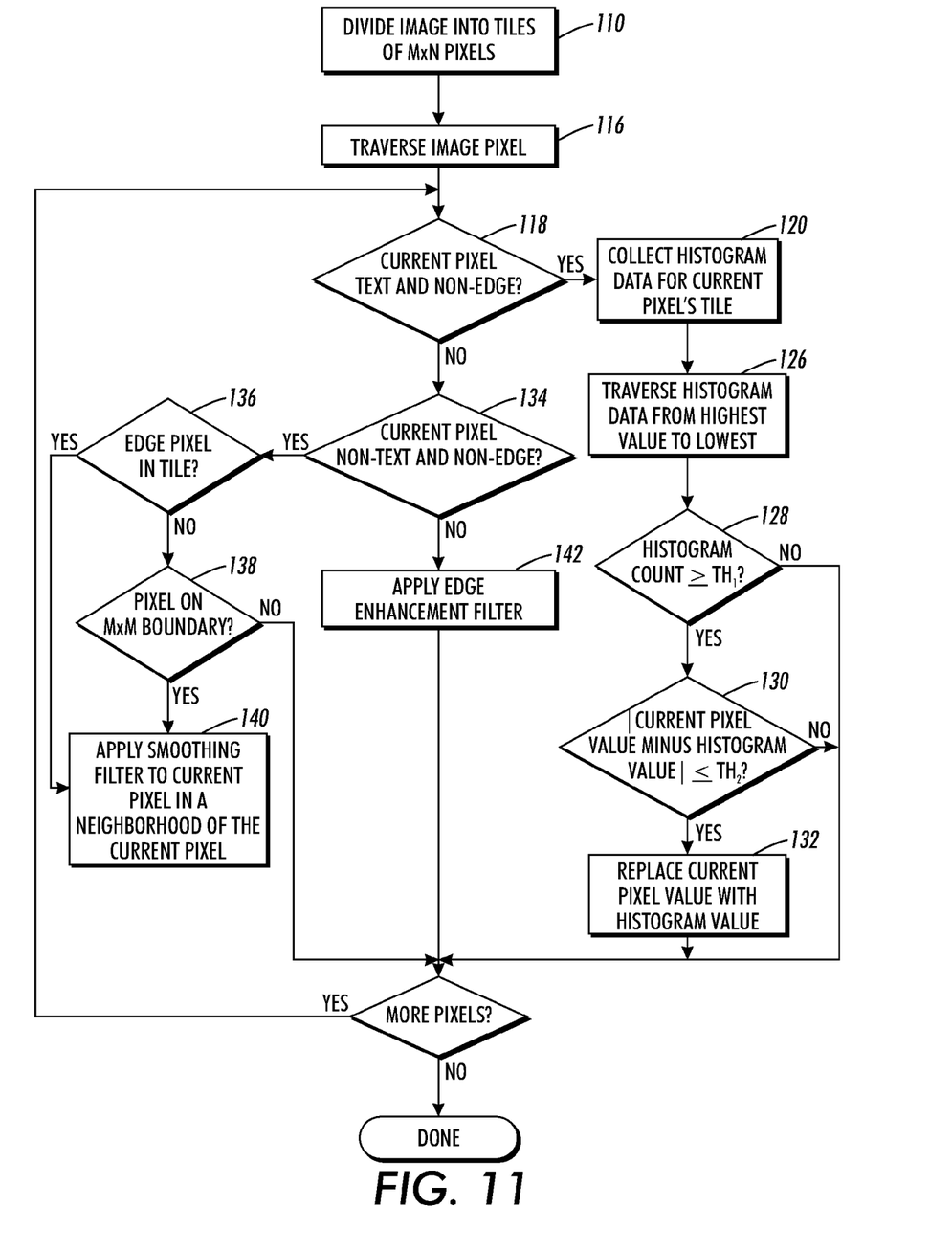
FIG. 11 is a functional block diagram of a method for removing ringing and blocking artifacts.
Figure 12:
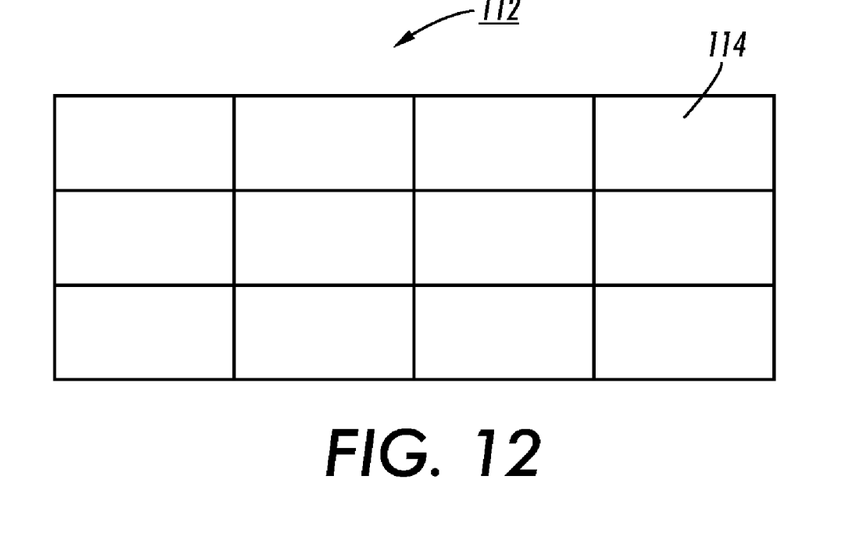
FIG. 12 is an m×n tile according to an alternate embodiment of the present application
Figure 13:
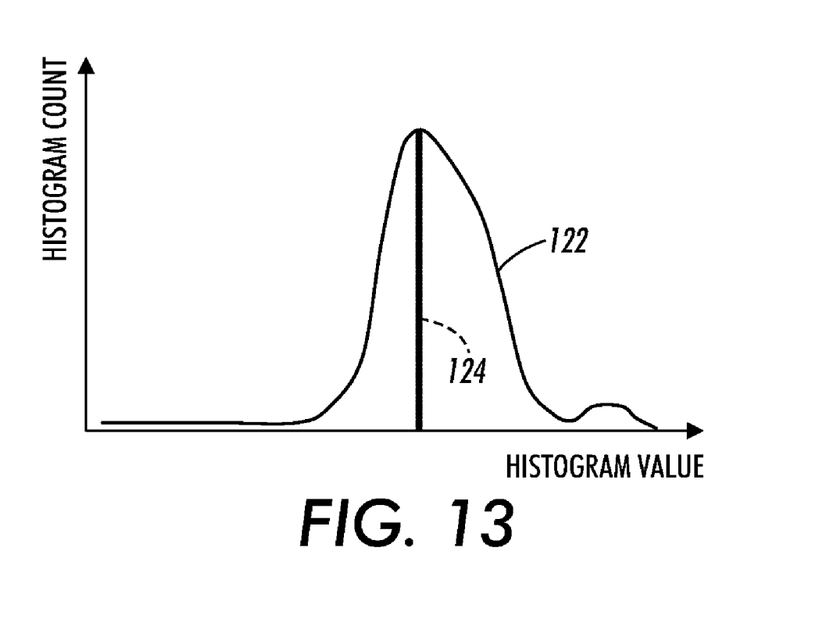
FIG. 13 is a typical histogram of a decompressed image having gradually varying pixel values.

With reference now to FIG. 11, the image is first divided into tiles of m×n pixels (110) as shown by the tile 112 in FIG. 12 made up of m columns by n rows of pixels 114, where m and n are predetermined parameters. With continuing reference to FIG. 11, the image pixels are then traversed and examined (116) individually. If the current pixel is tagged as both text and non-edge (118), histogram data of the corresponding m×n tile window is collected (120), unless already collected for the previously examined pixel. A typical histogram for an image having a large number of gradually varying values is shown in FIG. 13. The histogram counts 122 are shown plotted against the histogram gray (color) values, or simply histogram values, typically 0 to 255, with the most frequently occurring value shown by the dashed line 124. With reference again to FIG. 11, the histogram is traversed from the highest value to the lowest value (126). For each point on the histogram, if the histogram count is greater than or equal to $TH_1$ (128), where $TH_1$ is a predetermined percentage of the window size used to collect the histogram, it is then determined if the absolute value of the current pixel value minus the current histogram value is less than or equal to $TH_2$ (130), where $TH_2$ is a predetermined threshold value. If both conditions are true, the current pixel value is replaced with the current histogram value (132).

On the other hand, if the current pixel is tagged as both non-text and non-edge, a smoothing filter may be applied to the current pixel based on an s×t window which is preferably smaller than the current m×n tile window, using only those pixels from the m×n neighborhood which are tagged as non-edge, and for which the absolute value of the current pixel neighbor value minus the current pixel value is less than or equal to $TH_3$, where $TH_3$ is another predetermined threshold. However, before applying the smoothing filter, in order to not smooth the image unnecessarily, it is first determined if there is an edge pixel in the tile (136) or if the current pixel lies on an M×M boundary, e.g. 8×8, from the original DCT-based compression (138) and if the current pixel value differs from the edge pixel by at least $TH_4$, $TH_4$ being yet another predetermined threshold. If the stated conditions are true, the smoothing filter is applied to the current pixel (140), i.e. the smoothing filter is applied to all of the luminance and chrominance channels. In some embodiments, the chrominance channels always undergo smoothing by the filter if the pixels are tagged as non-edge pixels.

For the remaining pixels tagged as edge pixels, an enhancement filter is applied (142) to the luminance channel to enhance the edges.

Figure 14:
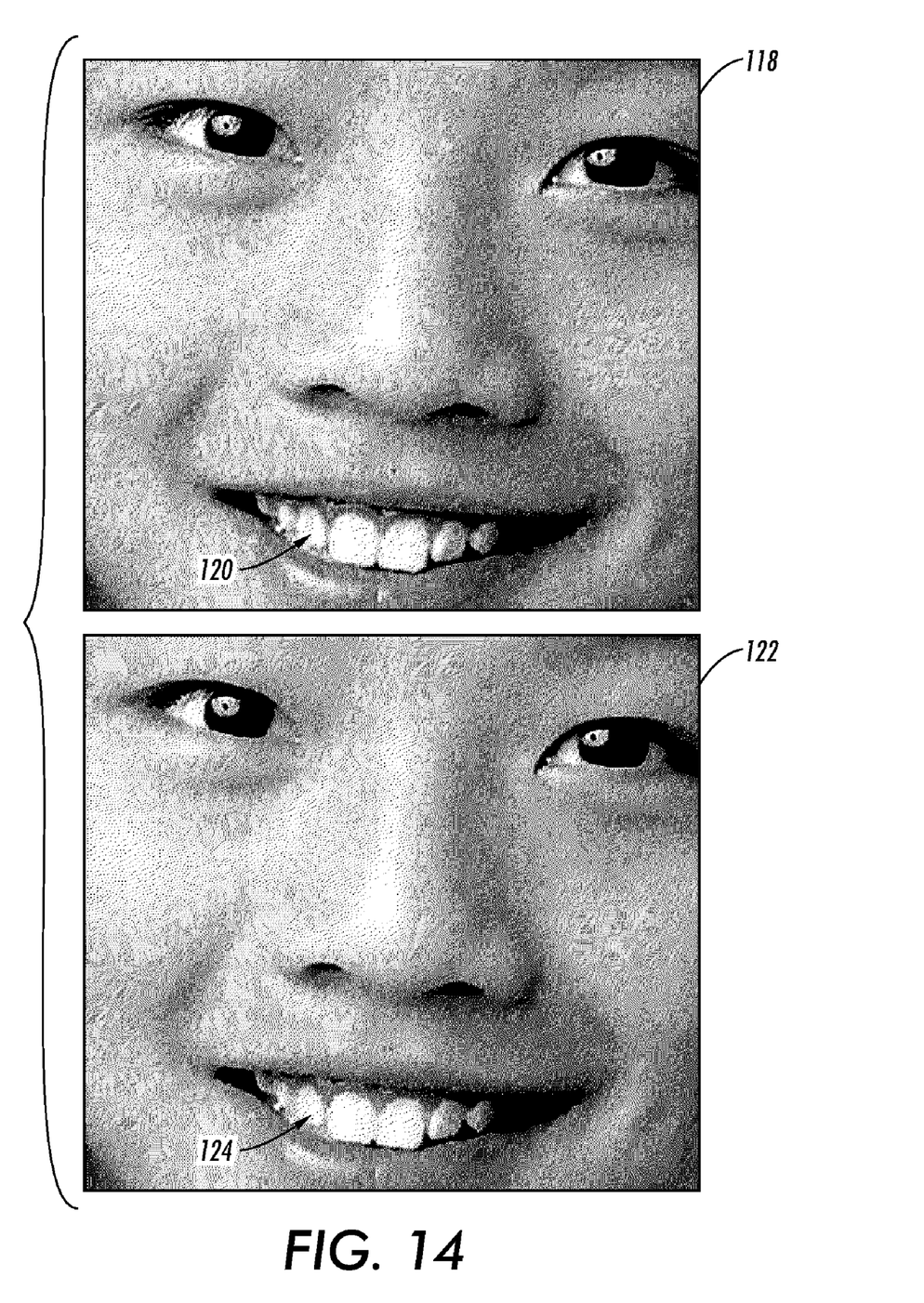
FIG. 14 is an example of removing blocking artifacts from a decompressed photographic image having infringing colors and sharp edges according to an alternate embodiment of the present application.

An example of application of the method described with reference to FIG. 11 is provided in FIG. 14. In the figure, an original decompressed image 118 is shown having some color fringing along the nostrils of the subject's face as well as some around the teeth 120. The image was enhanced using the above-described method to remove the color fringing, producing the enhanced image 122. It may be observed that edge detail was retained, with particular reference to the subject's teeth 124 in the enhanced image. It may also be observed that the enhanced image 122 is more visually appealing than the original decompressed image 118 because of the removal or reduction of blocking artifacts in areas of the image with smooth, gradually changing color tones.

Figure 15:
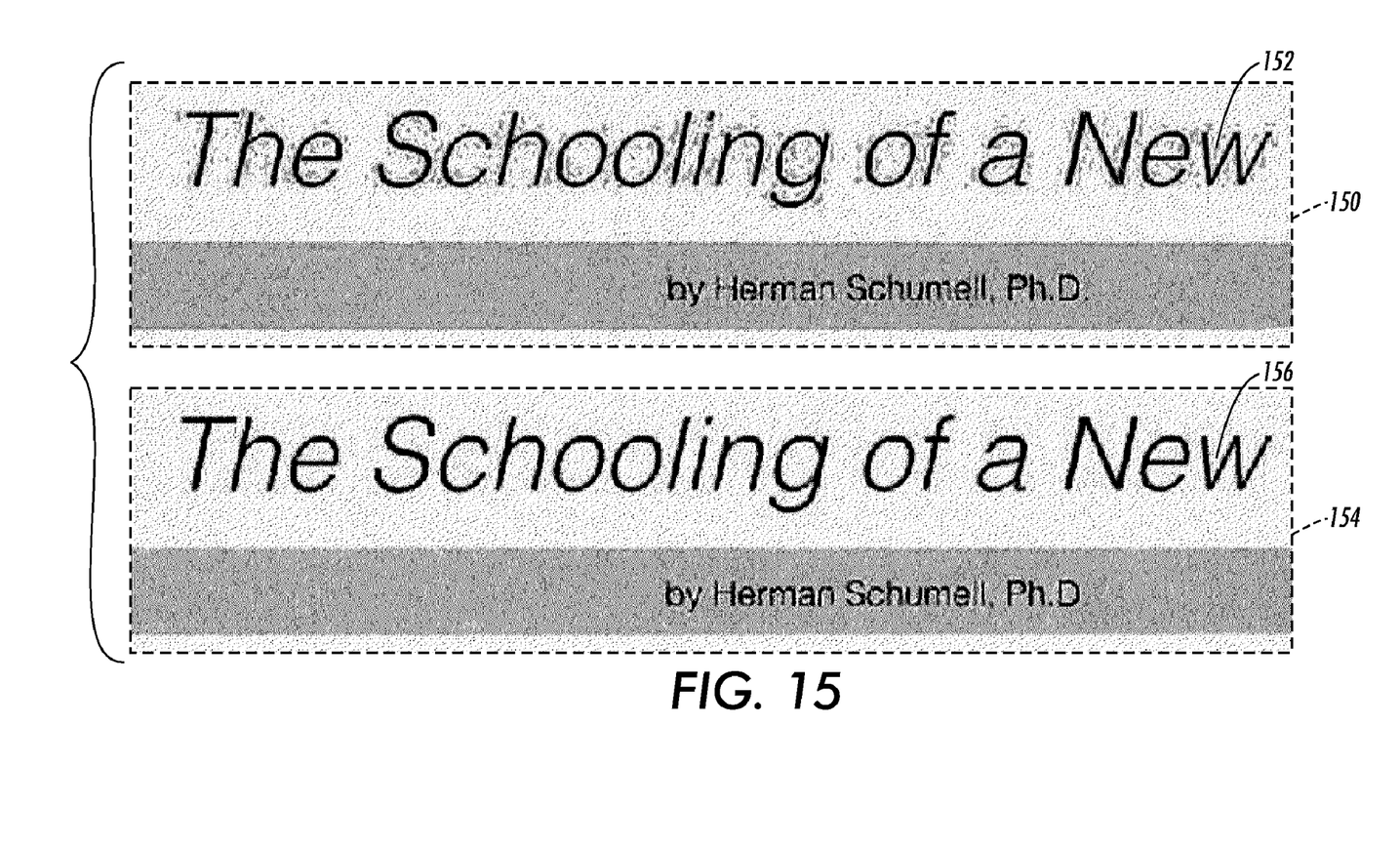
FIG. 15 is an example of enhancing a textual image having ringing artifacts according to an alternate embodiment of the present application.

Another example including textual information is provided with reference now to FIG. 15. It may be observed that the original decompressed image 150 suffered from a large number of ringing artifacts 152. Application of the above-described method produced the enhanced image 154 where it may be readily observed that the occurrence of ringing artifacts was significantly reduced in the area 156 previously subject to ringing. With reference to the edges of the text displayed in the enhanced image 154, it may also be observed that the edges of the text are sharpened in comparison to the original decompressed image 150, while, simultaneously, the color fringing was greatly reduced. The degree of edge sharpening can be controlled by using a sharpening filter of appropriate aggressiveness.

Yet other embodiments employ a variation of the method described with reference to FIG. 11. For example, when a decompressed digital color image includes the chrominance and the luminance channels, the luminance channel can be cleansed as described, however, the chrominance channel can always undergo smoothing for pixels that are tagged as non-edge pixels.

It will be appreciated that, while the above-described methods were described with respect to JPEG images, the methods can be applied with good efficacy to any compression/decompression method which produces ringing artifacts, or other similar artifacts in the background of document images.

It will be further appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of removing ringing artifacts from a decompressed digital color image, the decompressed digital color image including a chrominance channel and a luminance channel, and further including a background and one or more foreground regions, the method comprising:
   performing a luminance channel processing, the luminance channel processing including:
      extracting a luminance channel histogram from the luminance channel;
      determining a background luminance value by selecting the most frequently occurring value from the luminance channel histogram as the background luminance value;
      computing a threshold luminance value, the threshold luminance value comprising a boundary value between background pixels of the digital image and foreground pixels of the digital image;

thresholding the luminance channel based on the threshold luminance value to form a thresholded luminance channel;

performing a morphological filtering on the thresholded luminance channel to form a mapped luminance channel image, the morphological filtering selected from one of a dilation process and an erosion process based on the background luminance value, to enlarge the foreground regions of the thresholded luminance channel, the enlarged foreground regions now including edge pixels of the foreground regions of the thresholded luminance channel, the background pixels of the mapped luminance channel image forming a luminance mapping of the digital image luminance channel, the luminance mapping including the background pixels of the mapped luminance channel image based on the threshold luminance value; and cleansing the background region luminance channel of the decompressed digital image based on the luminance mapping.

2. The method of claim 1, the determining the background luminance value including:

computing the background luminance value based on a weighted sum of the most frequently occurring value and values within a vicinity of the most frequently occurring value in the luminance channel histogram.

3. The method of claim 1, the cleansing the background region luminance channel including:

performing a logical OR operation on the decompressed digital image luminance channel with the mapped luminance channel image if the background luminance value is greater than pixel luminance values of the foreground regions; and performing a logical AND operation on the decompressed digital image with the mapped luminance channel image if the background luminance value is less than pixel luminance values of the foreground regions.

4. The method of claim 1, further comprising:

performing a chrominance channel processing, the chrominance channel processing including:

extracting a chrominance channel histogram from the chrominance channel;

determining a background chrominance value by selecting the most frequently occurring value from the chrominance channel histogram as the background chrominance value;

computing a threshold chrominance value, the threshold chrominance value comprising a boundary value between background pixels of the digital image and foreground pixels of the digital image;

thresholding the chrominance channel based on the threshold chrominance value to form a thresholded chrominance channel;

performing a morphological filtering on the thresholded chrominance channel to form a mapped chrominance channel image, the morphological filtering selected from one of a dilation process and an erosion process based on the background chrominance value, to enlarge the foreground regions of the thresholded chrominance channel, the enlarged foreground regions now including edge pixels of the foreground regions of the thresholded chrominance channel, the background pixels of the mapped chrominance channel image forming a chrominance mapping of the digital image chrominance channel, the chrominance mapping including the background pixels of the mapped chrominance channel image based on the threshold chrominance value; and cleansing the background region chrominance channel of the decompressed digital image based on the chrominance mapping.

5. The method of claim 4, the determining the background chrominance value including:

computing the background chrominance value based on a weighted sum of the most frequently occurring value and values within a vicinity of the most frequently occurring value in the chrominance channel histogram.

6. The method of claim 4, the cleansing the background region chrominance channel including:

performing a logical OR operation on the decompressed digital image chrominance channel with the mapped chrominance channel image if the background chrominance value is greater than pixel chrominance values of the foreground regions; and performing a logical AND operation on the decompressed digital image with the mapped chrominance channel image if the background chrominance value is less than pixel chrominance values of the foreground regions.

7. The method of claim 1, further comprising:

performing a chrominance channel processing, the chrominance channel processing including:

determining a background chrominance value by computing an average of the chrominance values of pixels corresponding to pixels in the luminance mapping of the digital image luminance channel;

replacing the background chrominance value for each pixel in the background region with the computed background chrominance value.

8. A method of removing ringing and blocking artifacts from a decompressed digital image, the method comprising:

dividing pixels of the decompressed digital image into tiles; and performing an enhancement process for each pixel of the decompressed image, the enhancement process including:

if the current pixel is a text pixel and a non-edge pixel, performing a first enhancement procedure, the first enhancement procedure including:

collecting a histogram for the tile containing the current pixel, the histogram including histogram values as a function of histogram pixel values; and for each histogram value, replacing the current pixel value with the histogram value if the histogram count is greater than or equal to a predetermined percentage $TH_1$ and if the absolute value of the current pixel value minus the histogram pixel value is less than or equal to a predetermined threshold $TH_2$;

if the current pixel is a non-text pixel and a non-edge pixel, performing a second enhancement procedure, the second enhancement procedure comprising:

applying a smoothing filter to the current pixel based on the tile including the current pixel if at least one edge pixel lies within the tile containing the current pixel; and if the current pixel is an edge pixel, applying an edge enhancement filter to the current pixel.

9. The method of claim 8, the second enhancement procedure comprising:

applying the smoothing filter to the current pixel based on a neighborhood of pixels including the current pixel if at least one edge pixel lies within the tile containing the current pixel and if the current pixel lies on an edge of an original boundary of an original DCT transformation.

10. The method of claim 8, the second enhancement procedure comprising:

applying the smoothing filter to the current pixel based on a neighborhood of pixels including the current pixel if at least one edge pixel lies within the tile containing the current pixel and if the current pixel value differs from the edge pixel by at least a predetermined threshold $TH_4$.

* * * * *